United States Patent
Ataka

Patent Number: 5,299,615
Date of Patent: Apr. 5, 1994

[54] SAFETY TIRE

[75] Inventor: Hiroshi Ataka, Miki, Japan

[73] Assignee: Sumitomo Rubber Industries, Ltd., Kobe, Japan

[21] Appl. No.: 692,552

[22] Filed: Apr. 29, 1991

[30] Foreign Application Priority Data

May 7, 1990 [JP] Japan .................................. 2-117935

[51] Int. Cl.$^5$ ........................ B60C 3/00; B60C 17/00
[52] U.S. Cl. .................................. 152/454; 152/517; 152/555
[58] Field of Search ............ 152/454, 517, 555, 547; 524/496

[56] References Cited

U.S. PATENT DOCUMENTS

| | | | |
|---|---|---|---|
| 4,326,576 | 4/1982 | Mizumoto et al. | 524/496 X |
| 4,365,659 | 12/1982 | Yoshida et al. | 152/517 X |
| 4,779,658 | 10/1988 | Kawabata et al. | 152/517 |
| 4,824,899 | 4/1989 | Yasuda | 152/547 X |
| 4,917,164 | 4/1990 | Ushikubo et al. | 152/517 |
| 5,058,646 | 10/1991 | Kajikawa et al. | 152/454 |

FOREIGN PATENT DOCUMENTS 55-114606 9/1980 Japan .................................. 152/517

Primary Examiner—Michael W. Ball
Assistant Examiner—Adrienne C. Johnstone

[57] ABSTRACT

The present invention relates to a run-flat tire comprising an inner sidewall disposed on an axially inner curved face of the carcass in each sidewall portion, the inner sidewall tapered to have a crescent cross-sectional shape, the radius of the curvature of a primary portion of the axially inner face being 0.30 to 0.50 times the tire section height, the total thickness of each sidewall portion satisfying the following conditions: $0.18 \leq x/H \leq 0.34$; $y < x$; $300 < (x+y)^{yx/y} \leq 450$, wherein x equals the total thickness (mm) measured along a straight line drawn normal to the carcass from the axially outer edge of the radially innermost belt ply; y equals the total thickness (mm) measured at the maximum section width point at which the cross section width of the tire is maximum; H equals the section height of the tire. The inner sidewall is made of rubber consisting of 100 parts by weight of a rubber compound, 40 to 60 parts by weight of carbon black whose particle diameter is 70 to 50 nano-meters, and 3 to 8 parts by weight sulfur, wherein the rubber compound consists of 50 to 80 parts by weight of polybutadiene which includes 1,2-polybutadiene at not less than 75 weight % and whose crystallization is not more than 10%, and 20 to 50 parts by weight of at least one kind of rubber selected from polyisoprene rubber, styrene-butadiene rubber, cis-1,4-polybutadiene rubber and halogenated butyl rubber.

2 Claims, 2 Drawing Sheets

SAFETY TIRE

The present invention relates to a pneumatic tire and more particularly a safety tire capable of running for a relatively long distance at a high speed in a punctured condition.

BACKGROUND OF THE INVENTION

A run flat tire is required to have an ability to run continuously for a relatively long distance at a high speed under a deflated or punctured condition. For example, to achieve safe running on expressways, a run flat tire is required to have such an ability to run for a distance of more than 50 km at a speed of about 80 km/hr.

Hitherto, a system in which a load supporting elastic member is disposed inside a tire, and a system in which an inflated tube member like a small size tire is separately disposed inside a tire to form a double-chamber structure, have been proposed. Such systems, however, do not serviceability because of the increased weight and the resultant decrease in dynamic characteristics as well as further complex maintenance works.

Therefore, to increase the sidewall thickness and thereby to support the tire load under deflated conditions, a tire in which a reinforcing rubber layer is disposed on the axially inside of the carcass in each of the sidewall portion, has been proposed. However, when the sidewall thickness is simply increased, the tire weight is also increased; and radiation of internal heat is hindered which results in an internal structural failure; and further ride comfort is impaired. On the other hand, to avoid the thickness increase, when the elastic modulus of the rubber against a compressive stress is increased, the tire is durability against the repeated bent deformation is lost, and further heat generation increases.

SUMMARY OF THE INVENTION

It is therefore, an object of the present invention to provide a safety tire of which run flat performance is improved by disposing an inner sidewall rubber layer axially inside the carcass and then specifically defining the sidewall thickness and the composition for the inner sidewall rubber and the radius of curvature of the carcass in the sidewall portions.

According to one aspect of the present invention, a safety tire comprises a tread portion, a pair of axially spaced bead, each provided with a bead core, a pair of sidewall portions extending between the tread edges and the bead portions, a carcass extending between the bead portions and turned up around the bead cores to be secured thereto, belt reinforcements including at least two plies of cords disposed radially outside the carcass and inside a tread, an inner sidewall disposed on an axially inner curved face of the carcass in each sidewall portion, the inner sidewall tapered at its radially outer and inner edges to have a crescent cross-sectional shape, the radius of the curvature of the axially inner face of the carcass in each sidewall portion being in the range of 0.30 to 0.50 times the section height of the tire, the total thickness of each sidewall portion satisfying the following conditions:

$$0.18 \leq x/H \leq 0.34$$

$$y < x$$

$$300 \leq (x+y)^{x/y} \leq 450$$

wherein
- $x$ = the total thickness (mm) measured along a straight line drawn normal to the carcass from the axially outer edge of the radially innermost belt ply,
- $y$ = the total thickness (mm) measured at the maximum section width point at which the cross section width of the tire is maximum,
- $H$ = said section height of the tire, said inner sidewall made of rubber consisting of
- 100 parts by weight of a rubber compound,
- 40 to 60 parts by weight of carbon black whose particle diameter is 70 to 50 nano-meters, and
- 3 to 8 parts by weight sulfur, wherein said rubber compound consists of
- 50 to 80 parts by weight of polybutadiene which includes 1,2-polybutadiene at not less than 75 weight % and whose crystallization is not more than 15%, and
- 20 to 50 parts by weight of at least one kind of rubber selected from polyisoprene rubber, styrene-butadiene rubber, cis-1,4-polybutadiene rubber and halogenated butyl rubber.

BRIEF DESCRIPTION OF THE DRAWINGS

An embodiment of the present invention will now be described in detail with reference to the accompanying drawings, in which.

DETAILED DESCRIPTION OF THE DRAWINGS

Figure 1:
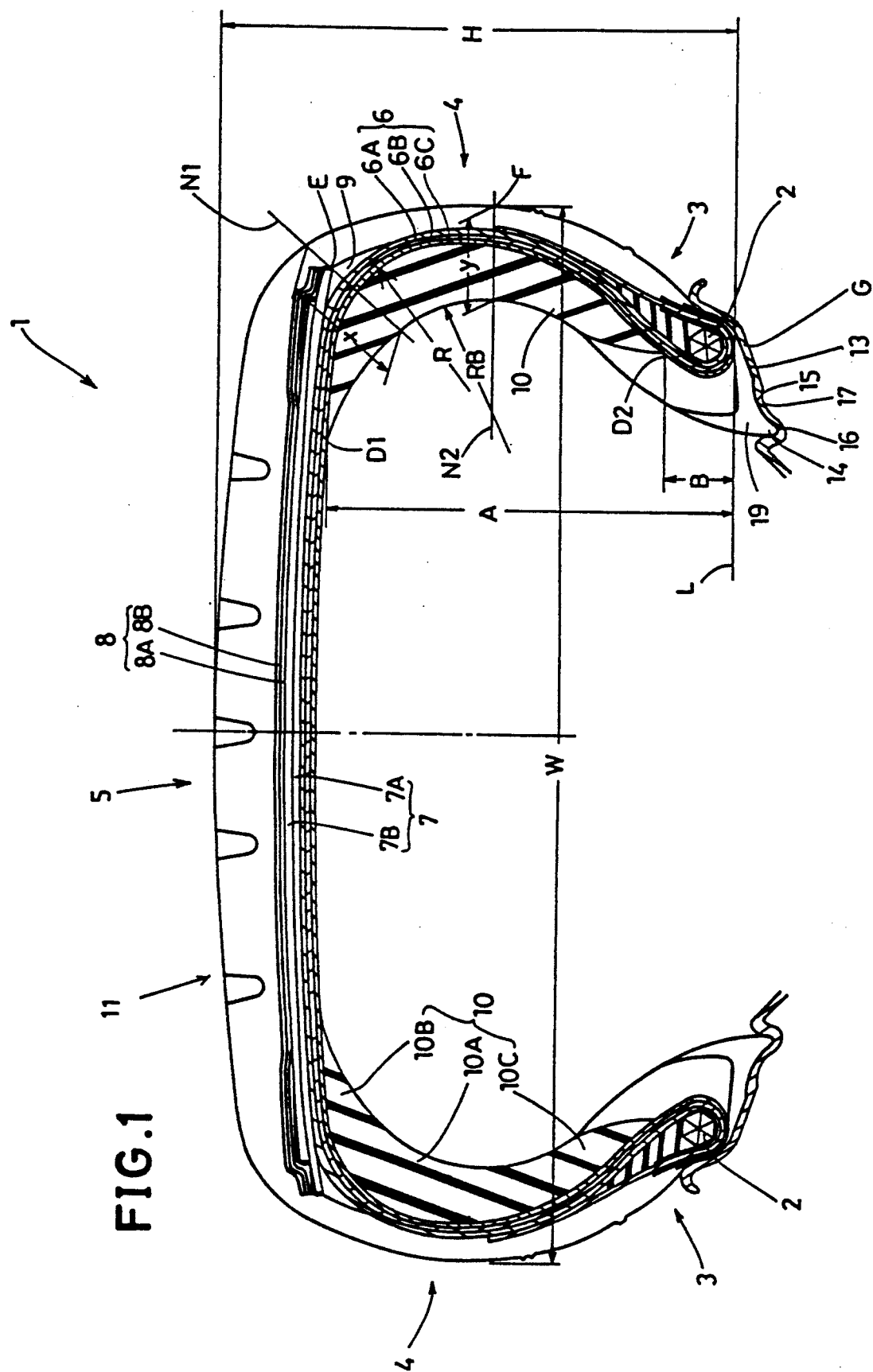
FIG. 1 is a sectional view showing a tire according to the the present invention.
Figure 2:
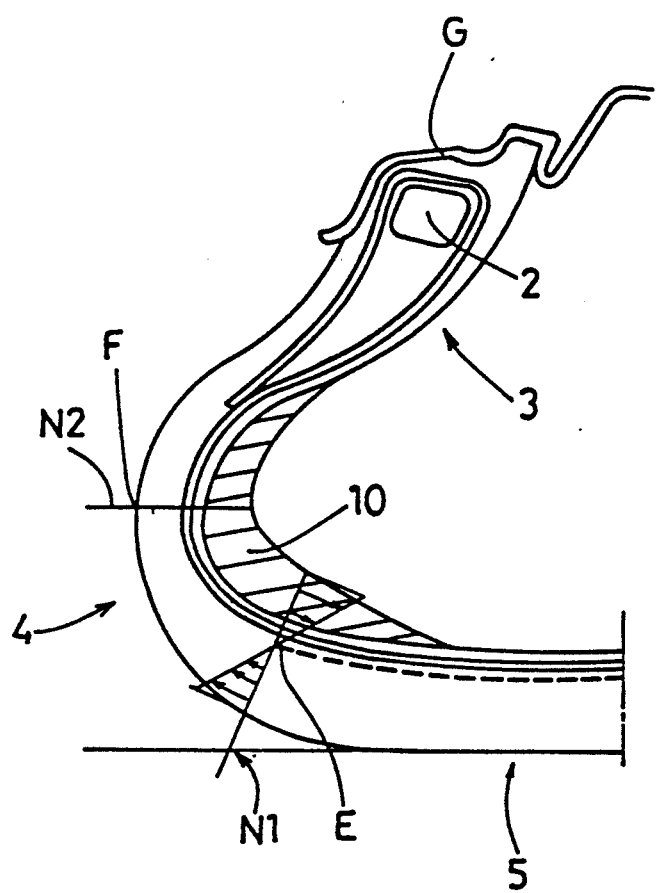
FIG. 2 is a sectional view showing the tire in a deflated and loaded state.

In the figures, safety tire 1 has a pair of axially spaced bead portions 3 having a bead core 2, a tread portion 5, and a pair of sidewall portions 4 extending radially outwardly from the bead portions to the tread edges.

The tire 1 has a radial tire structure 11 comprising a toroidal carcass 6 extending between the bead portions and turned up around the bead cores to be secured thereto, and belt reinforcements disposed radially outside the carcass.

The carcass 6 is composed of two plies 6A and 6B of cords arranged radially at 60 to 90 degrees to the tire equator, and the edges of each ply are turned up around the bead cores from the axially inside to the outside of the tire to form two turned up portions and one main portion therebetween. In this embodiment, a carcass ply 6C, whose edges are not turned up but are terminated beneath the bead cores, is disposed inside the ply 6B.

For the carcass cords, steel cords and organic fiber cords, e.g. rayon, polyester, nylon, aramid and the like can be used.

In each sidewall portion, the radius R of a primary part of curvature of the inner face of the carcass is set to be 0.30 to 0.50 times the section height H of the tire. In this example, the radius is in the range of 33 mm to 50 mm.

When the radius is less than 0.30×H, the bent rigidity of the sidewall portion decreases, and when the radius is more than 0.50×H, the bent rigidity increases.

The belt reinforcements includes a breaker 7 and a band 8.

The breaker 7 in this embodiment is composed of two plies 7A and 7B of parallel cords inclined with respect to the tire equator so that the cords in each ply cross the cords in the next ply.

The radially inner ply 7A disposed on the radially outside of the carcass is wider than the outer ply 7B.

For the breaker cords, steel cords or high modulus organic fiber cords such as aromatic polyamide cords are preferably used, and low modulus organic fiber cords, e.g. nylon, polyester, rayon and the like can be used together therewith.

However, the breaker may be formed only by such low modulus organic fiber cords to allow the breaker a certain deformation or elongation according to carcass deformation.

On the radially outside of the breaker, the band 8 is disposed. The band is extended from one edge to the other edge of the breaker to cover the whole width of the breaker.

The band 8 in this example is composed of two plies 8A and 8B of parallel cords laid at a small or zero angle to the circumferential direction, and the edges of each ply align with the edges of the breaker.

For the band cords, organic fiber cords, e.g. rayon, nylon, polyester and the like are used to mitigate the share stress between the rigid breaker and the tread rubber and thereby to prevent separation of the breaker edges from rubber.

Further, a breaker cushion 9 made of soft rubber is disposed between each edge of the breaker and the carcass, and further in each bead portion a bead apex made of hard rubber extending radially outwardly and taperingly from the bead core is disposed between each carcass turned up portion and the main portion.

Thus, the above-mentioned tire structure 11 is formed, and a tread, outer sidewalls and inner sidewalls 10 are disposed thereon.

The tread is made of rubber and disposed on the radially outside of the above-mentioned belt reinforcements to define the tread portion 5.

The outer sidewalls are made of rubber and disposed on the axially outer sides of the carcass, and the inner sidewalls 10 are made of rubber and disposed on the axially inner sides of the carcass.

The radially outer edge and inner edge of each inner sidewall 10 are tapered so that the inner sidewall has a crescent cross-sectional shape.

The radially outward tapered portion 10B is extended somewhat into the tread portion from its main portion 10A, and the inward tapered portion 10C is extended to the bead portion. The radial height B of the radially inner edge D2 thereof from the bead base line L is 0.1 to 0.3 times the tire section height H from the bead base line L, and the radial height A of the radially outer edge D1 thereof from the bead base line is 0.7 to 0.8 times the tire section height H.

Preferably, the radius RB of curvature of the inner surface of the inner sidewall 10 is more than the above-mentioned radius R of the carcass and not more than 0.50 times the tire section height H, in this example not more than 50 mm.

In the present invention, the total thickness of the sidewall portion is set as follows.

The ratio x/H of a thickness x to the tire section height H is not less than 0.18 and not more than 0.34, where the thickness x is measured along a straight line N1 drawn normal to the carcass from the axially outer edge E of the innermost breaker ply 7A adjacent to the carcass 6.

Based on the thickness x (mm), a thickness y (mm) at the maximum width point F is set to satisfy the following equations 1) and 2)

$$y < x \qquad 1)$$

$$300 \leq (x+y)^{x/y} \leq 450 \qquad 2)$$

The above-mentioned maximum width point F is a point on the outside of the tire sidewall portion at which the cross section width of the tire becomes maximum measured along the axial line N2 drawn through the maximum width point F.

Hereinafter, $(x+y)^{x/y}$ will be referred as thickness distribution index.

When the thickness distribution index is less than 300, the sidewall is liable to be folded near the belt edge E. On the other hand, when the index is more than 450, the sidewall is liable to be folded near the tire maximum width point F. In either case, the sidewall can not support the tire load.

In this embodiment, the tire 1 is provided with a bead retaining system to prevent bead dislocation from rim bead seats under a deflated condition.

In each bead portion, a relatively thick bead rubber 19 is disposed axially inside the carcass to form a bead toe 14. The bead rubber 19 is extended radially outwardly to the radially inner edge of the inner sidewall 10 to overlap with the above-mentioned tapered portion 10C and axially outwardly to a position beneath the bead core to define the bead base which is tapered. The bead toe 14 extends radially inwardly at the axially inner end of the bead base to be inserted into a groove 16 formed at the axially inner end of a tapered bead seat 13 of a wheel rim G. Further, the bead base is provided with a groove 15 immediately axially outside the bead toe and inside the bead core, which groove 15 fits to a hump 17 formed in the bead seat 13 of the rim G.

Furthermore, in order to prevent the bead portion from being chafed by the rim, a chafer or organic fabric is disposed along the profile of the bead portion, which extends from the axially inside to the outside of the bead portion. Incidentally, it may be possible to form a toe in only one of the bead portions.

The above-mentioned inner sidewall rubber consists of
 100 parts by weight of a rubber compound,
 40 to 60 parts by weight of carbon black whose particle diameter is 70 to 50 nano-meters, and
 3 to 8 parts by weight sulfur.

Further, vulcanization accelerator, age resistor, softener and the like are mixed therein.

The above-mentioned rubber compound is consist of 50 to 80 parts by weight of polybutadiene which includes 1,2-polybutadiene at not less than 75 weight % and whose crystallization is not more than 15%, and 20 to 50 parts by weight of at least one kind of rubber selected from polyisoprene rubber, styrene-butadiene rubber, cis-1,4-polybutadiene rubber and halogenated butyl rubber.

Such polybutadiene including the 1,2-structure can be made by the methods described in, for example Japanese Patent Publication (KOKOKU) Nos. 44-32425, 44-32426, 46-38700 and 47-1226.

When the 1,2-polybutadiene is less than 75%, the modulus of the inner sidewall 10 becomes insufficient to reinforce the sidewall portion.

When the crystallization is more than 15%, the vulcanized rubber becomes excessively hard, and its processability becomes poor.

In the above-mentioned rubber compound, if the mixing of the polybutadiene is less than 50 parts by weight, in other words the mixing of the other ingredient is more than 50 parts by weight, the modulus of the compound when vulcanized becomes poor. If the mixing of the polybutadiene is more than 80 parts by weight, the strength and elongation at breakage of the vulcanized rubber compound becomes insufficient to reinforce the sidewall portions of the safety tire.

In the above-mentioned inner sidewall rubber, as explained above, 40 to 60 parts by weight of carbon black is mixed with 100 parts by weight of the rubber compound.

If the mixing of the carbon black is less than 40 parts by weight, the reinforcing effect becomes poor, but if it is more than 60 parts by weight, the elasticity decreases and processability is greatly lowered and the heat generation property becomes worse.

From heat generation and reinforcing effect, it is preferable for the carbon black that the iodine number is not more than 80 ml/g, and the dibutyl phthalate oil absorption is not less than 90 ml/100 g.

Further, in the inner sidewall rubber, 3 to 8 parts, preferably 5 to 7 parts by weight of sulfur (as the sulfur itself and/or the sulfur in an organic vulcanizing agent) is mixed with 100 parts by weight of the rubber compound.

When it is less than 3 parts by weight, the percentage of crystallization of the vulcanized compound becomes excessively high, and the modulus thereof is decreased largely as the temperature increases.

When it exceeds 8 parts by weight, the strength decreases rapidly, and the impact strength becomes decreased.

As the above-mentioned organic vulcanizing agent including sulfur, 4,4'-dithiodimorpholine, alkylthiuramdisulfide, alkylphenoldisulfide and the like can be preferably used.

Table 1 and Table 2 show test rubber compositions and their characteristics (strength, elongation at breakage, 100% modulus and heat generation).

The strength and elongation at breakage were measured according to the methods specified in JIS-K6301, and the heat generation was measured according to ASTM D623-67.

Table 3 shows the results of comparison tests.

Test tires of size 215/50R14.5 having the tire construction shown in FIG. 1 and specifications given in Table 3 were prepared and tested.

In the test, each test tire was mounted on its regular rim of size LT5, and installed on one of rear wheels of a delivery van whose maximum pay load was 1 ton.

The tire was run at speed of 80 km/Hr under a zero pressure condition, and the running distance to breakage was measured. As shown in Table 3, it was confirmed that the tires according to the present invention had excellent run flat performance.

TABLE 1

| Rubber No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| INGREDIENT (weight %) | | | | | | | | | | | | | | | | |
| Compound No. in Table 2 | 1 | 2 | 3 | 4 | 5 | 6 | 7 | 8 | 3 | 3 | 3 | 3 | 3 | 3 | 3 | 3 |
| weight % | 80 | 70 | 60 | 50 | 75 | 75 | 45 | 85 | 60 | 60 | 60 | 60 | 80 | 50 | 80 | 50 |
| polyisoprene rubber | 0 | 30 | 40 | 50 | 25 | 25 | 55 | 15 | 40 | 40 | 40 | 40 | 20 | 50 | 20 | 50 |
| carbon black | | | | | | | | | | | | | | | | |
| FEF * | 50 | 50 | 50 | 50 | 50 | 50 | 50 | 50 | 50 | 50 | 50 | 50 | 0 | 0 | 0 | 0 |
| GPF | 0 | 0 | 0 | 0 | 0 | 0 | 0 | 0 | 0 | 0 | 0 | 0 | 40 | 60 | 60 | 40 |
| stearic acid | 2 | 2 | 2 | 2 | 2 | 2 | 2 | 2 | 2 | 2 | 2 | 2 | 2 | 2 | 2 | 2 |
| zinc oxide | 5 | 5 | 5 | 5 | 5 | 5 | 5 | 5 | 5 | 5 | 5 | 5 | 5 | 5 | 5 | 5 |
| sulfur | 5 | 5 | 5 | 5 | 5 | 5 | 5 | 5 | 3 | 8 | 2 | 9 | 5 | 5 | 5 | 5 |
| vulcanization accelerator | 2 | 2 | 2 | 2 | 2 | 2 | 2 | 2 | 2 | 2 | 2 | 2 | 2 | 2 | 2 | 2 |
| age resistor | 1 | 1 | 1 | 1 | 1 | 1 | 1 | 1 | 1 | 1 | 1 | 1 | 1 | 1 | 1 | 1 |
| TEST RESULTS | | | | | | | | | | | | | | | | |
| Strength (kgf/sq. cm) | 146 | 152 | 167 | 172 | 110 | 112 | 105 | 103 | 162 | 101 | 112 | 98 | 120 | 168 | 162 | 170 |
| Elongation at breakage (%) | 224 | 202 | 250 | 241 | 240 | 242 | 250 | 258 | 252 | 248 | 266 | 250 | 240 | 205 | 241 | 244 |
| 100% mdoulus (kgf/sq. cm) | 86 | 81 | 94 | 98 | 55 | 52 | 48 | 42 | 57 | 89 | 56 | 48 | 82 | 92 | 90 | 92 |
| Heat generation | 9 | 8 | 7 | 7 | 12 | 12 | 15 | 17 | 8 | 7 | 12 | 16 | 7 | 8 | 6 | 7 |

*) particle diameter FEF: 52 millimicrons GPF: 70 millimicrons

TABLE 2

| Compound No. | 1 | 2 | 3 | 4 | 5 | 6 | 7 | 8 |
|---|---|---|---|---|---|---|---|---|
| INGREDIENT (weight %) | | | | | | | | |
| 1,2-polybutadiene | 75 | 85 | 92 | 97 | 85 | 72 | 90 | 96 |
| cis-1,4-polybutadiene | 25 | 15 | 8 | 3 | 15 | 28 | 10 | 4 |
| TACTICITY | | | | | | | | |
| syndiotactic | 25 | 45 | 50 | 51 | 52 | 53 | 60 | 78 |
| isotactic | 35 | 10 | 5 | 3 | 0 | 0 | 0 | 0 |
| atactic | 40 | 45 | 45 | 46 | 48 | 47 | 40 | 22 |
| Crystallization (%) | 0 | 5 | 10 | 15 | 20 | 35 | 70 | 75 |

TABLE 3

| Tire | Ex. 1 | Ex. 2 | Ref. 1 | Ref. 2 | Ref. 3 | Ref. 4 | Ref. 5 | Ref. 6 | Ref. 7 |
|---|---|---|---|---|---|---|---|---|---|
| Distribution index | 300 | 450 | 280 | 460 | 280 | 300 | 400 | 300 | 300 |
| x/H | 0.18 | 0.34 | 0.20 | 0.30 | 0.38 | 0.16 | 0.40 | 0.30 | 0.30 |
| B/H | 0.70 | 0.80 | 0.80 | 0.80 | 0.80 | 0.70 | 0.70 | 0.65 | 0.65 |
| A/H | 0.30 | 0.10 | 0.05 | 0.35 | 0.30 | 0.25 | 0.30 | 0.25 | 0.15 |
| R (mm) | 33 | 50 | 30 | 52 | 33 | 52 | 28 | 33 | 33 |
| RB (mm) | 50 | 50 | 45 | 50 | 50 | 45 | 50 | 40 | 33 |
| Run Flat Performance | | | | | | | | | |

TABLE 3-continued

| Tire | Ex. 1 | Ex. 2 | Ref. 1 | Ref. 2 | Ref. 3 | Ref. 4 | Ref. 5 | Ref. 6 | Ref. 7 |
|---|---|---|---|---|---|---|---|---|---|
| Running distance (km) | | | | | | | | | |
| @ maximum load | 100 | 115 | 40 | 54 | 88 | 80 | 44 | 85 | 84 |
| @ 70% load | *500 | *500 | 96 | 100 | 206 | 180 | 120 | 320 | 400 |

*) The tire was not broken.
In each tire, the rubber No. 3 in Table 1 was used for the inner sidewalls.

I claim:

1. A run-flat tire comprising
   a tread portion having a tread and a pair of tread edges,
   a pair of axially spaced bead portions, each said bead portion having with a bead core therein,
   a pair of sidewall portions, one of said pair of sidewall portions extending between each of said tread edges and one of said bead portions,
   a carcass extending between said bead portions and turned up around the bead cores to be secured thereto,
   belt reinforcements including at least two plies of cords disposed radially outside the carcass and inside the tread,
   an inner sidewall disposed on an axially inner curved face of the carcass in each sidewall portion,
   said inner sidewall having an axially inner surface and being tapered at its radially outer and inner edges to have a crescent cross-sectional shape,
   the total thickness of each said sidewall portion satisfying the following conditions:

$0.18 \leq x/H \leq 0.34$ $y < x$ $300 \leq (x+y)^{x/y} \leq 450$ wherein $x =$ the total thickness (mm) measured along a straight line N1 drawn normal to the carcass from the axially outer edge of the radially innermost belt ply,
   $y =$ the total thickness (mm) measured at the maximum section width point at which the cross section width of the tire is maximum along an axial line N2 drawn through the maximum width point,
   $H =$ the section height of the tire,
   said inner sidewall made of rubber consisting of
   100 parts by weight of a rubber compound
   40 to 60 parts by weight of carbon black whose particle diameter is 70 to 50 nano-meters, and
   3 to 8 parts by weight sulfur,
   wherein said rubber compound consists of
   50 to 80 parts by weight of polybutadiene which includes 1,2-polybutadiene at not less than 75 weight % and whose crystallization is in a range from greater than 0% to 10%, and 20 to 50 parts by weight of at least one kind of rubber selected from polyisoprene rubber, styrene—butadiene rubber, cis 1, 4-polybutadiene rubber and halogenated butyl rubber.

2. The tire according to claim 1, wherein the radial height of the radially outer edge of said inner sidewall from the bead base is 0.7 to 0.8 times the tire section height (H), and the radial height of the radially inner edge thereof from the bead base is 0.1 to 0.3 times the tire section height (H).

* * * * *